(12) United States Patent
Sander et al.

(10) Patent No.: US 10,896,259 B2
(45) Date of Patent: Jan. 19, 2021

(54) THREAT SCORE DETERMINATION

(71) Applicant: ENTIT Software LLC, Sunnyvale, CA (US)

(72) Inventors: Tomas Sander, Princeton, NJ (US); Brian Frederik Hosea Che Hein, Aliso Viejo, CA (US); Nadav Cohen, Sunnyvale, CA (US); Ted Ross, Austin, TX (US)

(73) Assignee: MICRO FOCUS LLC, Santa Clara, CA (US)

( * ) Notice: Subject to any disclaimer, the term of this patent is extended or adjusted under 35 U.S.C. 154(b) by 125 days.

(21) Appl. No.: 15/763,253

(22) PCT Filed: Sep. 28, 2015

(86) PCT No.: PCT/US2015/052650
§ 371 (c)(1),
(2) Date: Mar. 26, 2018

(87) PCT Pub. No.: WO2017/058142
PCT Pub. Date: Apr. 6, 2017

(65) Prior Publication Data
US 2018/0314834 A1   Nov. 1, 2018

(51) Int. Cl.
G06F 21/57   (2013.01)
G06F 16/28   (2019.01)
G06F 21/55   (2013.01)

(52) U.S. Cl.
CPC .......... *G06F 21/577* (2013.01); *G06F 16/284* (2019.01); *G06F 16/285* (2019.01); *G06F 21/554* (2013.01); *G06F 2221/034* (2013.01)

(58) Field of Classification Search
CPC .............................................. G06F 2221/034
See application file for complete search history.

(56) References Cited

U.S. PATENT DOCUMENTS 7,594,270 B2   9/2009   Church et al.
8,782,209 B2   7/2014   McHugh et al.
(Continued)

FOREIGN PATENT DOCUMENTS

WO   WO 2012167056       12/2012
WO   WO-2014130474 A1    8/2014
(Continued)

OTHER PUBLICATIONS

L. Liu et al., "Detecting malicious clients in ISP networks using HTTP connectivity graph and flow information," 2014 IEEE/ACM International Conference on Advances in Social Networks Analysis and Mining (ASONAM 2014), Beijing, 2014, pp. 150-157, doi: 10.1109/ASONAM.2014.6921576. (Year: 2014).*

(Continued)

*Primary Examiner* — Madhuri R Herzog

(57) ABSTRACT

In one example in accordance with the present disclosure, a method for threat score determination includes detecting a change in malicious activity for a security object. The method also includes identifying an indicator that provides contextual information for the security object and determining a linked resource that is associated with a database record of the security object. The method also includes determining a first threat score associated with the security object and determining a relationship between the linked resource and the security object. The method also includes determining a second threat score associated with the linked resource based on the indicator, the threat score of the linked object and the relationship between the linked resource and the security object.

17 Claims, 5 Drawing Sheets

(56) References Cited

U.S. PATENT DOCUMENTS

| | | | |
|---|---|---|---|
| 8,813,228 B2 | 8/2014 | Magee et al. | |
| 8,813,236 B1 | 8/2014 | Saha et al. | |
| 8,863,288 B1 | 10/2014 | Savage et al. | |
| 9,100,430 B1* | 8/2015 | Seiver | H04L 63/1433 |
| 2006/0064740 A1 | 3/2006 | Kelley et al. | |
| 2007/0169194 A1 | 7/2007 | Church et al. | |
| 2013/0125239 A1 | 5/2013 | McHugh et al. | |
| 2013/0247205 A1 | 9/2013 | Schrecker et al. | |
| 2013/0305356 A1* | 11/2013 | Cohen-Ganor | G06Q 40/00 726/22 |
| 2014/0137257 A1 | 5/2014 | Cordero et al. | |
| 2014/0283055 A1 | 9/2014 | Zahran | |
| 2016/0164905 A1* | 6/2016 | Pinney Wood | G06F 16/9024 726/25 |
| 2016/0261608 A1* | 9/2016 | Hu | H04L 63/126 |
| 2018/0285797 A1* | 10/2018 | Hu | G06Q 10/0635 |

FOREIGN PATENT DOCUMENTS

| | | |
|---|---|---|
| WO | WO-2014138115 A1 | 9/2014 |
| WO | WO-2014144081 A1 | 9/2014 |
| WO | WO-2015047394 A1 | 4/2015 |

OTHER PUBLICATIONS

K. M. Carter, N. Idika and W. W. Streilein, "Probabilistic Threat Propagation for Network Security," in IEEE Transactions on Information Forensics and Security, vol. 9, No. 9, pp. 1394-1405, Sep. 2014, doi: 10.1109/TIFS.2014.2334272. (Year: 2014).*
Hardy, S., Targeted Threat Index, Oct. 18, 2013, Research Brief, University of Toronto, 7 pages.
Hewlett-Packard, Security without Compromise: One Approach for the Financial Services Industry, Jul. 22, 2015, Information Security Media Group, 2 pages.
International Search Report and Written Opinion dated Jun. 23, 2016, PCT Patent Application No. PCT/US2015/052650 dated Sep. 28, 2015, Korean Intellectual Property Office.
Njemanze, H.S., Centralized Security Management Provides Foundation for Effective Intrustion Prevention, Aug. 20, 2004, Information Systems Control Journal, vol. 4, 3 pages.
Symantec, Inc., Severity Assessment, Feb. 23, 2006, Retrieved from the Internet: <https://www.symantec.com/content/en/us/about/media/securityintelligence/SSR-Severity—[retrieved Jul. 22, 2015], 5 pages.

* cited by examiner

THREAT SCORE DETERMINATION

BACKGROUND

Systems may determine threat scores of certain items to prioritize among different pieces of threat intelligence and to decide which threat intelligence to act on. Computing accurate threat scores for severity, confidence or impact of threat intelligence may be important for using threat intelligence data effectively and at scale.

BRIEF DESCRIPTION OF THE DRAWINGS

The following detailed description references the drawings, wherein.

DETAILED DESCRIPTION

A variety of problems in the field of threat intelligence have provided challenges for assigning threat scores in an accurate, meaningful way. One problem in particular is the dynamic nature of cyber threats; a server that was malicious one day may no longer be malicious the next day, or vice versa. Accordingly, connections from IP address associated with the server may no longer pose a threat.

Example systems for threat score determination described herein determine threat scores based on known properties and scores of other objects to which these indicators are linked to in a database. In this manner, the example systems can determine precise and timely threat scores that accurately represent rapid changes in the threat landscape.

For example, if a threat actor has been newly observed to utilize a known botnet for campaigns, the example systems for threat score determination may raise the severity scores of some or all of the indicators in a database that are directly linked to that botnet, such as C&C domains, malware species used, etc. A similar technique may be applied when new links between objects in the database are discovered.

A method for threat score determination may include detecting a change in malicious activity for a security object and identifying an indicator that provides contextual information for the security object. The method may include determining a linked resource that is associated with a database record of the security object and determining a first threat score associated with the security object. The method may also include determining a relationship between the linked resource and the security object and determining a second threat score associated with the linked resource based on the indicator, the threat score of the linked object and the relationship between the linked resource and the security object.

Figure 1:
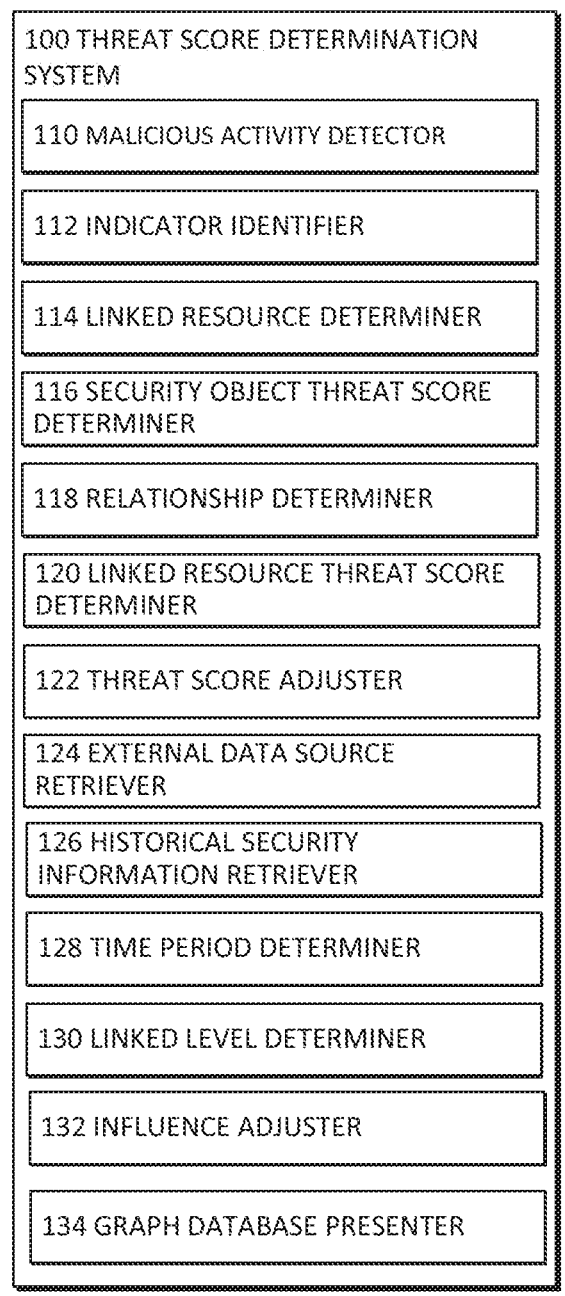
FIG. 1 is a block diagram of an example system for threat score determination.

FIG. 1 is a block diagram of an example system 100 for threat score determination. In the example shown in FIG. 1, system 100 may comprise various components, including a malicious activity detector 110, an indicator identifier 112, a linked resource determiner 114, a security object threat score determiner 116, a relationship determiner 118, a linked resource threat score determiner 120, a threat score adjuster 122, an external data source retriever 124, an historical security information retriever 126, a time period determiner 128, a linked level determiner 130, an influence adjuster 132, a graph database presenter 134 and/or other components. According to various implementations, threat score determination 100 may be implemented in hardware and/or a combination of hardware and programming that configures hardware. Furthermore, in FIG. 1 and other Figures described herein, different numbers of components or entities than depicted may be used. As is illustrated with respect to FIG. 5, the hardware of the various components of domain classification system 100, for example, may include one or both of a processor and a machine-readable storage medium, while the instructions are code stored on the machine-readable storage medium and executable by the processor to perform the designated function.

Malicious activity detector 110 may detect a change in malicious activity for a security object. Malicious activity detector 110 may detect the change in malicious activity in a variety of ways. In one example, malicious activity detector 110 may detect the change by receiving information identifying the change. The information may be received from, for example, a third party database. In another example, malicious activity detector 110 may detect the change by comparing connections and relationships of the security object and comparing the connections/relationships to known malicious actors. The security object may be one or more objects belonging to a database and/or data model. The security object may correspond to one or more lower level observables, such as an IP address, a domain name, a domain server, a mutex (mutual exclusion) a registry key data, an email header, a behavioral aspect of malware, etc.

The change may be detected in real time or near real time. The change in malicious activity may be a security object being identified as malicious or becoming associated with a malicious actor. The change in malicious activity may be security object that was previous identified as malicious, no longer being identified as malicious or no longer being associated with a malicious actor.

Indicator identifier 112 may identify an indicator that provides contextual information for the security object. Indicator identifier 112 may identify the indicator by analyzing the security object using, for example, meta-data of the security object. Indicator identifier 112 may identify the indicator by retrieving information from a data source, such as a database, third party service, etc. An "indicator," as used herein, may refer to a detection guidance for a security threat and/or vulnerability. The indicator may specify what to detect or look for (e.g., an observable) and/or what it means if detected. For example, the indicator may specify a certain Internet Protocol (IP) address to look for in the network traffic. The indicator may include the information that the detection of that IP address in the network traffic can indicate a certain malicious security threat such as a Trojan virus. In other words, the indicator may provide context for the security objects. This context may include time stamps, a time period that the security object was active, severity scores, etc. The indicator may belong to the same database and/or data model as the security object.

Linked resource determiner 114 may determine a linked resource that is associated with a database record of the security object. Linked resource determine 114 may, for example, query the database record of the security object and identify the linked resource that is linked or otherwise connected to the database record of the security object. In some aspects, linked resource determiner may determine all linked resources that are associated with the database record of the security object. For example, a threat intelligence repository may use a database and/or data model including a broad range of data types. Each security object in the database and/or data model may be linked to other security objects and/or indicators based on various relationships. These relationships are discussed in further detail below, in reference to relationship determiner 118.

Security object threat score determiner 116 may determine a threat score associated with the security object. Security object threat score determiner 116 may calculate a threat score associated with the security object and/or retrieve a previously determined threat score stored in, for example, a threat intelligence repository. Security object threat score determiner 116 may also use a known technique for calculating threat scores, such as the technique presented in Application No. PCT/US2015/026585, entitled "Security Indicator Scores," and is herein incorporated by reference in its entirety. The threat score may be represented numerically, such as a percentage, through words, such as different levels, etc. The threat score may correspond to a severity of a perceived threat of a given security object, a confidence level of the severity, or an impact of the severity.

Relationship determiner 118 may determine a relationship between the linked resource (e.g., as discussed herein with respect to linked resource determiner 114) and the security object. Relationship determiner 118 may determine the relationship by analyzing a label describing the type of relationship, analyzing information related to the linked resource and/o security object retrieved from one or more data sources, such as a database record corresponding to the linked resource and/or security object, a third party data service, a web site, etc. The relationship may describe the extent of interaction between the linked resource and the security object. The relationship may contain information describing the type of relationship as well as the date when the relationship was determined. Example relationships may include an "originates from source" label describing a relationship between a piece of threat intelligence and the contributor of the threat intelligence. Another example relationship is a "points to" level describing a relationship between a domain and an IP address. Another example relationship is a "command and control (C&C) server" describing a relationship between a domain name and a malware description. Yet another example relationship is a "has been associated with" label describing a relationship between an indicator and a threat actor. Another example relationship is a "collaborates with" label describing a relationship between two threat actors.

Linked resource threat score determiner 120 may select a linked resource to determine a score for. Linked resource threat score determiner 120 may determine certain conditions to contribute to the score computation. The conditions may correspond to an indicator (e.g., as discussed herein with respect to indicator identifier 112), the relationship between the linked resource and the security object (e.g., as discussed herein with respect to relationship determiner 118), etc. Conditions may also include a number of hops (i.e. path length) between the linked resource and another meta-object, a time variable, such as an acceptable time period for the information corresponding to the meta-objects. The time period may correspond to a recentness of the information. Other conditions could include data linked to certain threat actors, such as botnets, countries, individuals, etc.

Linked resource threat score determiner 120 may determine meta-objects that fulfill the condition. The meta-objects fulfilling the condition may be linked resources associated with a database record of the security object. Linked resource threat score determiner 120 may determine a threat score associated with the linked resource based on the indicator (e.g., as discussed herein with respect to indicator identifier 112), the threat score of the linked object (e.g., as discussed herein with respect to security object threat score determiner 116) and the relationship between the linked resource and the security object (e.g., as discussed herein with respect to relationship determiner 118).

For example, linked resource threat score determiner 120 may compute an average severity score for each meta-object that fulfills the condition. As will discussed below with respect to influence adjuster 132, linked resource threat determiner 120 may adjust the weight of the average based on an influence. Linked resource threat score determiner 120 may determine a final threat score by computing the maximum of all the averages for each node.

In this manner, the components of the threat score determination system 100 may determine a threat score for a security object (i.e. the linked resource) based on its relationships of other security objects and indicators in a threat intelligence repository, such as a database. Moreover, the components of the threat score determination system 100 may allow the threat scores to be updated based on a current status of the malicious activity of a given security object.

Threat score adjuster 122 may adjust a threat score, such as the threat score associated with a security object (e.g., as discussed herein with respect to security object threat score determiner 116) and/or a threat score associated with a linked resource (e.g., as discussed herein with respect to a linked resource threat score determiner 120). The threat score may be adjusted by a variety of factors, including an external data source, historical security information, a time period, a linked level and an influence. Each of these will be discussed in further detail below. Threat score adjuster 122 may adjust the threat score using the same techniques as discussed above in reference to the linked resource threat score determiner 120.

External data source retriever 124 may retrieve information from an external data source. The information may be related to a security object, a linked resource, an indicator, etc. The external data source may include a third party database, a subscription service, a publicly available database, a web page, etc. In this manner, the system 100 is not dependent solely on information internal to the database, but can enrich data based on information obtained from external sources. If the external web site has rated or scored the threat object under consideration, the threat score may be adjusted (e.g., as discussed herein with respect to the threat score adjuster 122).

Historical security information retriever 126 may retrieve historical security information. The historical information may be received from a data source, such as a database, third party data source, website, etc. The historical information may be related to a security object, a linked resource, an indicator, etc. and linked via a threat intelligence database. Historical information may be more complete as it has been vetted by many iterations, and thus carries a higher confidence (represented, for example, by a confidence score). The historical information may be used to adjust the threat score (e.g., as discussed herein with respect to the threat score adjuster 122).

Historical information, however, may not necessarily contribute to a higher score if there is a high likelihood it is out of date. Accordingly, time period determiner 128 may determine a time period for the historical information. The determined time period may also be compared to a threshold amount. If the determined time period is within the threshold amount, the historical information may be considered fresh, while if the determined time period is not within the threshold amount, the historical information may be considered stale. The threshold period could be in seconds, minutes, days, months, years, etc. The time period may be used to adjust the threat score (e.g., as discussed herein with respect to the threat score adjuster 122).

Moreover, the threat score adjuster 122 may consider the type of historical information in addition to the time period of the historical information when adjusting the threat score. The type of historical information may include an IP address, a domain, a threat actor's Tactics, Techniques and Procedures (TTP), etc. For example, an attacker's IP addresses and domains may be very easy to change, so the influence of this type of information may be lower over time. In contrast, a threat actor's TTP may be much harder to change over time and thus may have a higher degree of influence even for extended time periods. Influence is a representation of the importance of some information. Influence is discussed in further detail below, in reference to influence adjuster 132.

Linked level determiner 130 may determine a linked level between two meta-objects. A linked level is a number of links in a path between the two meta-objects. Linked level determiner 130 may analyze the path between the two meta-objects and identify the number of the links between the two meta-objects. The meta-objects may include linked resources, security objects, indicators, etc. For example, the linked level determiner 130 may determine a number of levels between the linked resource and the second linked resource. As described above with respect to the security object threat score determiner 116 and the linked resource threat score determiner 120, the threat score of a meta-object may be based on the information it is linked to in the security database. For example a malware indicator may be connected to an actor.

However, meta-objects may have linked relationships that are more than one level deep. Using the above example, the malware indicators may be connected to an actor, and the actor may, in turn, be connected to a documented case with a high severity score in which similar malware was used. This is an example of considering influence along several links. Although the previous example uses influence of two links, linked level determiner 130 may determine the linked level up to n links, where n is the length of the path. The linked level may be used to adjust the threat score (e.g., as discussed herein with respect to the threat score adjuster 122).

Influence adjuster 132 may adjust an influence. As used herein, an influence is a representation of the importance of some information. The influence can be represented numerically, alphabetically, etc. Information based on meta-objects that are further away in terms of the number of links (i.e. the length of the path) may affect the score less than information that is closer. Influence adjuster 132 may adjust the influence by determining the number of links between two meta-objects and comparing the number of links to a threshold. For example, influence adjuster 132 may lower an influence of a first meta-object on a second meta-object when the number of levels between the meta-objects is more than 2 levels. Of course, this is only an example, and any number of levels may be used. Influence may also be used to adjust the threat score (e.g., as discussed herein with respect to the linked resource threat score adjuster 122).

Graph database presenter 134 may present various aspects of threat determination system 100 as a graph-database. The graph database may include nodes and edges containing attributes. The nodes may correspond to meta-objects, such as a security object, an indicator and a linked resource. The attributes may correspond to key-value pairs. The nodes and/or edges may be labeled with information that displays a role within the overall data structure. For example, nodes may be labeled as "Source name", "Indicator", "Threat Actor", "Mitigation", "Campaign", "Attack," "Target" and/or other components from a data model. Each label may capture a broad range of security and related data. Attributes for an indicator may specify what type of indicator, a time stamp when the indicator was first and last seen and include scores for confidence, severity, authenticity, impact, etc. The scores may be expressed numerically, alphabetically etc. The links between the meta-objects (represented in the graph database by the nodes) may be represented by labeled edges. The labeled edges may be labeled with various properties, including information describing relationships between the meta-objects (e.g., as discussed herein with respect to relationship determiner 118. Edges may also include a score representing the confidence strength of the linkage. The scores may be expressed numerically, alphabetically etc.

In some examples, the threat score may be determined via the graph database. Specifically, graph database presenter 134 may select a node to determine or update a score for. Graph database presenter 134 may determine a type of node to contribute to the score computation. For example, a certain condition may be selected. Conditions may include how a number of hops (i.e. path length) between nodes, a minimum confidence score for the nodes and edges, including a time variable, such as an acceptable time period for the information corresponding to the nodes and edges. The time period may correspond to a recentness of the information. Other conditions could include data linked to certain threat actors, such as botnets, countries, individuals, etc.

Graph database presenter 134 may compute a set including all of the nodes that fit the condition. The set may also include the paths between the nodes fitting the condition. Graph database presenter 134 may compute a weighted average of the severity score of each nodes on the path and/or adjust an influence of a node used in computing the weighted average. In some examples, a weight may be determined based on the path between the nodes. For example, the number of links between two nodes may be determined and compared to a threshold. Graph database presenter 134 may lower an influence of a first node on a node when the number of levels between the meta-objects is more than a threshold number of levels, for example 2 levels. Of course, this is only an example, and any number of levels may be used. Graph database presenter 134 may determine a threat score by computing the maximum of all the weighted averages for each node.

Updates in the graph may also automatically trigger a re-computation of threat scores. Alternatively, threat scores may be recomputed in regular time intervals. In some aspects, other tools may be used to implement the features of threat determination score determination system 100.

Figure 2:
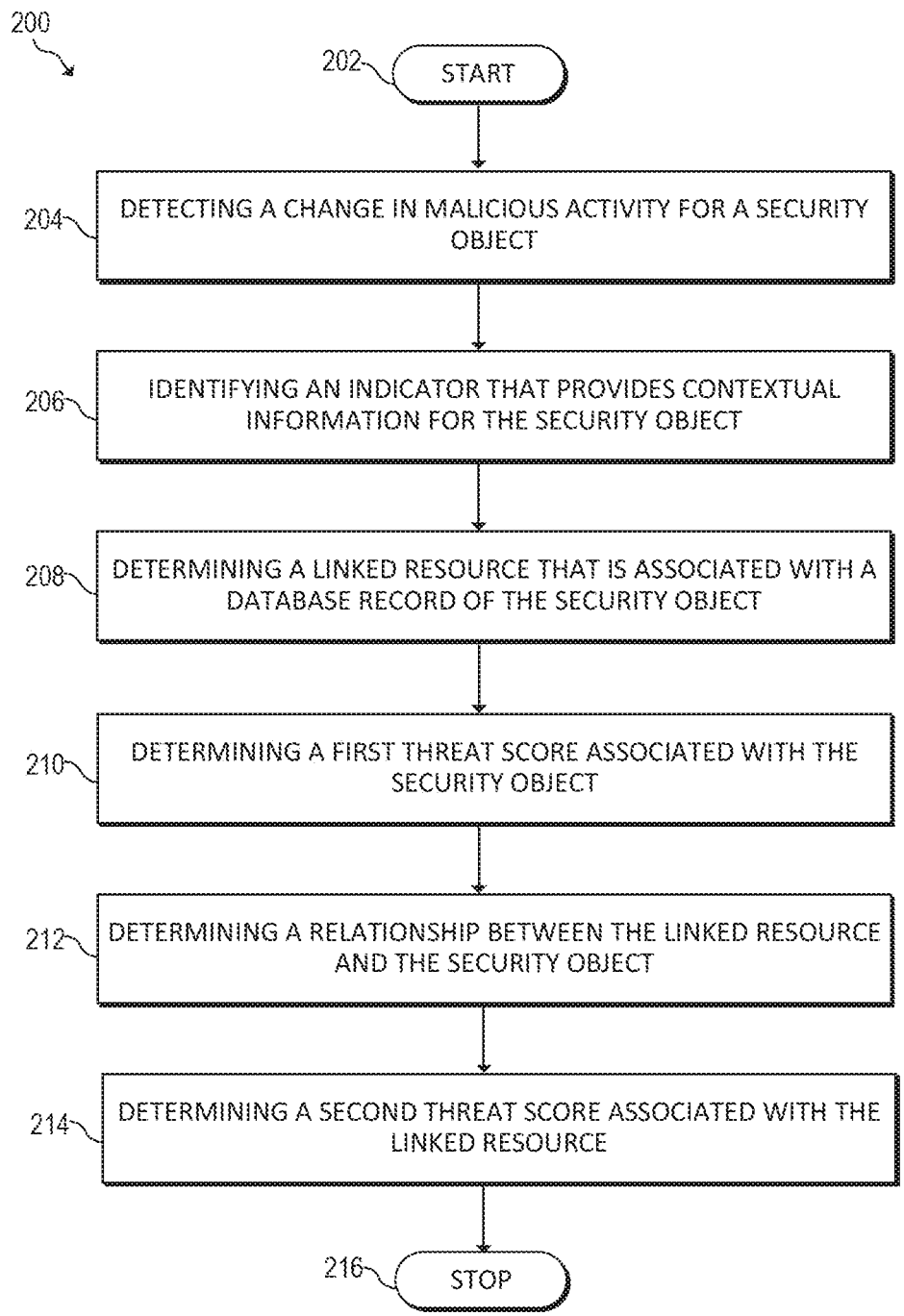
FIG. 2 is a flowchart of an example method for threat score determination.

FIG. 2 is a flowchart of an example method 200 for threat score determination. Method 200 may be described below as being executed or performed by a system, for example, system 100 of FIG. 1, system 400 of FIG. 4 or system 500 of FIG. 5. Other suitable systems and/or computing devices may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). In alternate examples of the present disclosure, at least one step of method 200 may be executed substantially concurrently or in a different order than shown in FIG. 2. In alternate examples of the present disclosure, method 200 may include more or less steps than are shown in FIG. 2. In some examples, at least one of the steps of method 300 may, at certain times, be ongoing and/or may repeat.

Method 200 may start at step 202 and continue to step 204, where the method may include detecting a change in malicious activity for a security object. At step 206, the method may include identifying an indicator that provides contextual information for the security object. At step 208, the method may include determining a linked resource that is associated with a database record of the security object. At step 210, the method may include determining a first threat score associated with the security object. At step 212, the method may include determining a relationship between the linked resource and the security object. At step 214, the method may include determining a second threat score associated with the linked resource. The second threat score may be based on the indicator, the threat score of the linked object and the relationship between the linked resource and the security object. Method 200 may eventually continue to step 216, where method 200 may stop.

Figure 3:
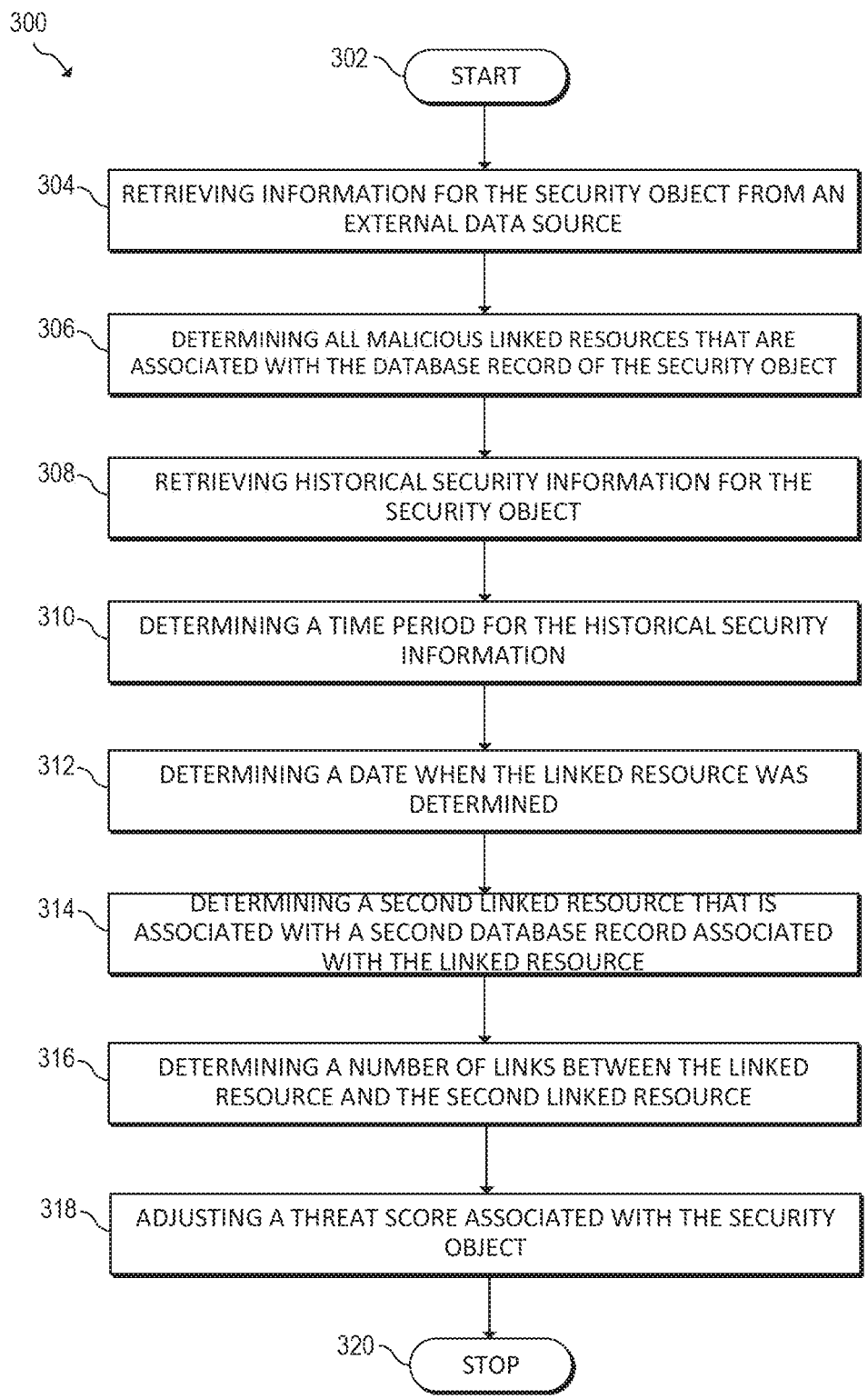
FIG. 3 is a flowchart of an example method for threat score adjustment.

FIG. 3 is a flowchart of an example method 300 for threat score adjustment. Method 300 may be described below as being executed or performed by a system, for example, system 100 of FIG. 1, system 400 of FIG. 4 or system 500 of FIG. 5. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate examples of the present disclosure, at least one step of method 300 may be executed substantially concurrently or in a different order than shown in FIG. 3. In alternate examples of the present disclosure, method 300 may include more or less steps than are shown in FIG. 3. In some examples, at least one of the steps of method 300 may, at certain times, be ongoing and/or may repeat.

Method 300 may start at step 302 and continue to step 304, where the method may include retrieving information for the security object from an external data source. At step 306, the method may include determining all malicious linked resources that are associated with the database record of the security object. At step 308, the method may include retrieving historical security information for the security object. At step 310, the method may include determining a time period for the historical security information. At step 312, the method may include determining a date when the linked resource was determined. At step 314, the method may include determining a second linked resource that is associated with a second database record associated with the linked resource. At step 316, the method may include determining a number of links between the linked resource and the second linked resource.

At step 318, the method may include adjusting a threat score associated with the security object. The threat score may be adjusted based on: information retrieved from an external data source (e.g., as discussed herein with respect to step 304), a number of associated malicious linked resources (e.g., as discussed herein with respect to step 306), the historical security information (e.g., as discussed herein with respect to step 308), the time period (e.g., as discussed herein with respect to step 310), the date when the linked resource was identified as a linked resource (e.g., as discussed herein with respect to step 312), a number of links between the linked resource and the second linked resource (e.g., as discussed herein with respect to step 316). Method 300 may eventually continue to step 320, where method 300 may stop.

Figure 4:
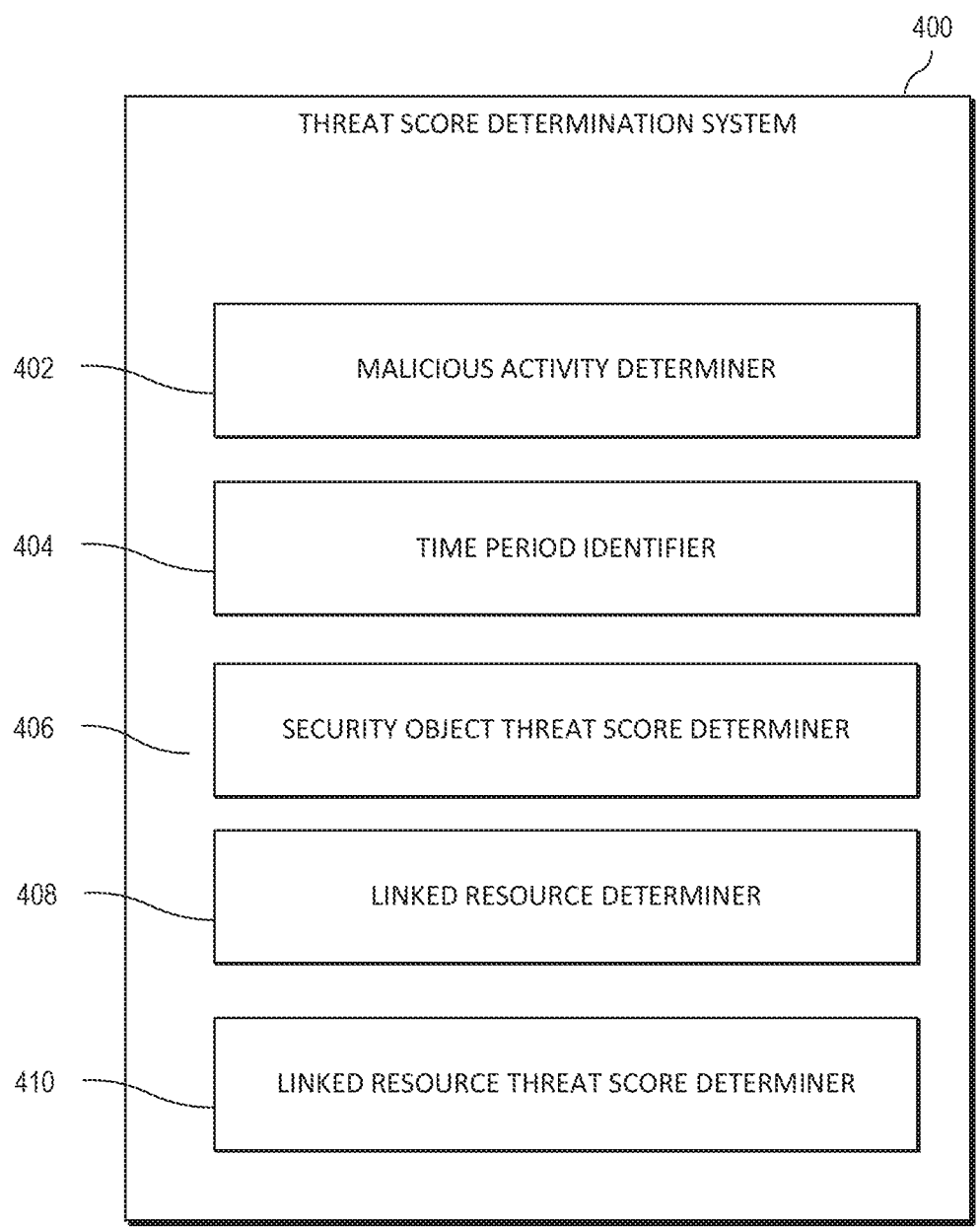
FIG. 4 is a block diagram of an example system for threat score determination.

FIG. 4 is a block diagram of an example threat score determination system 400. System 400 may be similar to system 100 of FIG. 1, for example. In FIG. 4, system 400 includes malicious activity determiner 402, time period identifier 404, security object threat score determiner 406, linked resource determiner 408 and linked resource threat score determiner 410.

Malicious activity determiner 402 may determine a change in malicious activity for a security object. A security object may include IP addresses, domain names, domain servers, mutex (mutual exclusion), registry key data, behavior aspects of malware, email headers, etc. Malicious activity determiner 402 may be implemented in the form of executable instructions stored on at least one machine-readable storage medium of system 400 and executed by at least one processor of system 400. Alternatively or in addition, malicious activity determiner 402 may be implemented in the form of at least one hardware device including electronic circuitry for implementing the functionality of malicious activity determiner 402.

Time period identifier 404 may identify a time period of a change in malicious activity. The time period may be in seconds, minutes, hours, days, etc. Time period identifier 404 may be implemented in the form of executable instructions stored on at least one machine-readable storage medium of system 400 and executed by at least one processor of system 400. Alternatively or in addition, time period identifier 404 may be implemented in the form of at least one hardware device including electronic circuitry for implementing the functionality of time period identifier 404.

Security object threat score determiner 406 may determine a first threat score associated with the security object. Security object threat score determiner 406 may be implemented in the form of executable instructions stored on at least one machine-readable storage medium of system 400 and executed by at least one processor of system 400. Alternatively or in addition, security object threat score determiner 406 may be implemented in the form of at least one hardware device including electronic circuitry for implementing the functionality of security object threat score determiner 406.

Linked resource determiner 408 may determine each linked resource in a security database that is associated with a database record of the security object. Linked resource determiner 408 may be implemented in the form of executable instructions stored on at least one machine-readable storage medium of system 400 and executed by at least one processor of system 400. Alternatively or in addition, linked resource determiner 408 may be implemented in the form of at least one hardware device including electronic circuitry for implementing the functionality of linked resource determiner.

Linked resource threat score determiner 410 may determine a threat score for each linked resource. The threat score may be based on a time period (e.g., as discussed herein with respect to the time period identifier 404), a first threat score (e.g., as discussed herein with respect to the security object threat score determiner 406), and a relationship between the linked resource and the security object. Linked resource threat score determiner 410 may be implemented in the form of executable instructions stored on at least one machine-readable storage medium of system 400 and executed by at least one processor of system 400. Alternatively or in addition, linked resource threat score determiner 410 may be implemented in the form of at least one hardware device including electronic circuitry for implementing the functionality of linked resource threat score determiner 410.

Figure 5:
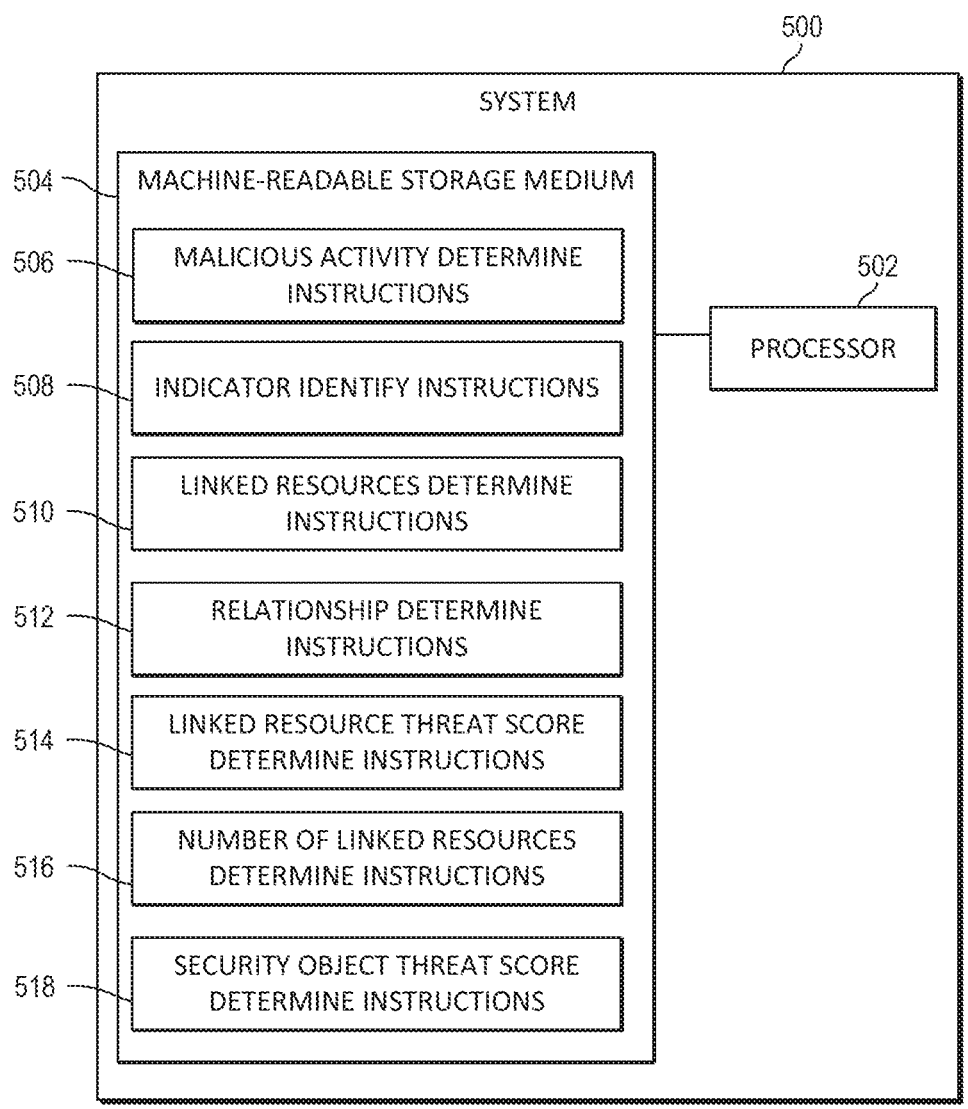
FIG. 5 is a block diagram of an example system for threat score determination.

FIG. 5 is a block diagram of an example system 500 for threat score determination. System 500 may be similar to system 100 of FIG. 1, for example. In the example illustrated in FIG. 5, system 500 includes a processor 502 and a machine-readable storage medium 504. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be one or more central processing units (CPUs), microprocessors, field programmable gate arrays (FPGAs) and/or other hardware devices suitable for retrieval and execution of instructions stored in machine-readable storage medium 504. In the example illustrated in FIG. 5, processor 502 may fetch, decode, and execute instructions 506, 508, 510, 512, 514, 516 and 518 to perform threat score determination. As an alternative or in addition to retrieving and executing instructions, processor 502 may include one or more electronic circuits comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Alternatively, machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for threat score determination.

Referring to FIG. 5, malicious activity determine instructions 506, when executed by a processor (e.g., 502), may cause system 500 to determine a change in malicious activity for a security object. Indicator identify instructions 508, when executed by a processor (e.g., 502), may cause system 500 to identify an indicator that provides contextual information for the security object. Linked resources determine instructions 510, when executed by a processor (e.g., 502), may cause system 500 to determine a plurality of linked resources that are associated with a database record of the security object.

Relationship determine instructions 512 may determine, for each linked resource in the plurality, a relationship between the security object and the linked resource. Linked resource threat score determine instructions 514, when executed by a processor (e.g., 502), may cause system 500 to determine a linked resource threat score for each linked resource in the plurality. Number of linked resources determine instructions 516, when executed by a processor (e.g., 502), may cause system 500 to determine a number of linked resources in the plurality that are classified as malicious. Security object threat score determine instructions 518, when executed by a processor (e.g., 502), may cause system 500 to determine a threat score associated with the security object based on the indicator, the relationship between the security object and each linked resource in the plurality and the number of linked resources in the plurality that are classified as malicious.

The foregoing disclosure describes a number of examples for threat score determination. The disclosed examples may include systems, devices, computer-readable storage media, and methods for threat score determination. For purposes of explanation, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
   detecting, by a computer, a change in malicious activity for a security object;
   identifying, by the computer, an indicator that provides contextual information for the security object;
   determining, by the computer, a first linked resource that is associated with a first database record of the security object;
   determining, by the computer, a threat score associated with the security object;
   determining, by the computer, a relationship between the first linked resource and the security object;
   determining, by the computer, a second linked resource that is associated with the first linked resource by a second database record;
   determining, by the computer, a number of levels between the first linked resource and the second linked resource;
   comparing, by the computer, the number to a threshold;
   determining, by the computer, an influence of the second linked resource on the first linked resource based on the comparison; and
   determining, by the computer, a threat score for the security object based on the indicator, a threat score for the first linked resource, the relationship between the first linked resource and the security object, and the influence.

2. The method of claim 1, wherein the first linked resource and the second linked resource are part of a plurality of linked resources, the method further comprising:
identifying the plurality of linked resources; and
determining a threat score for each linked resource of the plurality of linked resources based on the indicator, the threat score of the indicator and a relationship between the each linked resource and the security object.

3. The method of claim 1, further comprising:
retrieving information for the security object from an external data source; and
adjusting the threat score for the security object based on the information for the security object from the external data source.

4. The method of claim 1, further comprising:
determining a plurality of malicious linked resources that are associated with the first database record; and
adjusting a threat score for the first database record based on a[[the]] number of the plurality of malicious linked resources.

5. The method of claim 1, further comprising:
retrieving historical security information for the security object;
determining a time period for the historical security information; and
adjusting the threat score based on the historical security information and the time period.

6. The method of claim 1, further comprising:
determining a date when the first linked resource was determined; and
determining a threat score associated with the first linked resource based on the date.

7. The method of claim 1, wherein the threat score is determined via a graph database, wherein the security object, the indicator, the first linked resource, and the second linked resource are represented by nodes of a graph, and wherein links between the security object, the indicator, the first linked resource and the second linked resource are represented by labeled edges of the graph.

8. A system comprising:
a processor; and
a memory to store instructions that, when executed by the processor, cause the processor to:
determine a change in malicious activity for a security object;
identify a time period of the change;
determine a first threat score associated with the security object;
determine a plurality of linked resources in a security database associated with a database record of the security object;
determine, for each linked resource of the plurality of linked resources, an associated threat score based on the time period, the first threat score, and a relationship between the each linked resource and the security object;
determine a number of levels between a first linked resource of the plurality of linked resources and a second linked resource of the plurality of linked resources;
compare the number to a threshold; and
determine an influence of the second linked resource on the associated threat score for each linked resource based on the comparison.

9. The system of claim 8, wherein the instructions, when executed by the processor, further cause the processor to:
cause the influence to be lower in response to the number being above the threshold.

10. The system of claim 8, wherein the instructions, when executed by the processor, further cause the processor to:
determine a date when each linked resource of the plurality of linked resources was determined; and
adjust the threat score associated with the each linked resource based on the date when the each linked resource was determined.

11. A non-transitory machine-readable storage medium storing instructions that, when executed by a processor of a computing device, cause the processor to:
determine a change in malicious activity for a security object;
identify an indicator that provides contextual information for the security object;
determine a plurality of linked resources that are associated with a database record of the security object;
determine, for each linked resource of the plurality of linked resources, a relationship between the security object and the each linked resource;
determine a linked resource threat score for the each linked resource of the plurality of linked resources;
determine a number of linked resources of the plurality of linked resources that are classified as malicious;
determine a number of levels between a first linked resource of the plurality of linked resources and a second linked resource of the plurality of linked resources;
compare the number of levels to a threshold;
determine an influence of the second linked resource on the first linked resource based on the comparison; and
determine a threat score associated with the security object based on the indicator, the relationship between the security object and the each linked resource of the plurality of linked resources, the number of linked resources of the plurality of linked resources that are classified as malicious, and the influence.

12. The non-transitory machine-readable storage medium of claim 11, wherein the instructions, when executed by the processor, further cause the processor to:
determine a confidence score for the database record based on the number of linked resources of the plurality of linked resources that are classified as malicious.

13. The non-transitory machine-readable storage medium of claim 11, wherein the instructions, when executed by the processor, further cause the processor to:
determine a threat score for each linked resource of the plurality of linked resources based on the indicator, the threat score of the security object and a relationship between the indicator and the each linked resource.

14. The method of claim 1, wherein the indicator represents information to observe to determine whether the security object is associated with a security threat or a security vulnerability.

15. The method of claim 1, further comprising:
identifying a time period corresponding to the change in a malicious activity; and
determining threat scores for the first linked resource and the second linked resource based on the time period.

16. The method of claim 1, wherein determining the influence comprises causing the influence to be lower in response to the number being above the threshold.

17. The non-transitory machine-readable storage medium of claim 11, wherein the instructions, when executed by the processor, further cause the processor to cause the influence to be lower in response to the number of levels being above the threshold.

* * * * *